(12) United States Patent
Tanaka et al.

(10) Patent No.: US 10,539,416 B2
(45) Date of Patent: Jan. 21, 2020

(54) SENSOR POSITIONING DEVICE

(71) Applicant: Murata Manufacturing Co., Ltd., Nagaokakyo-shi, Kyoto-fu (JP)

(72) Inventors: Yuta Tanaka, Nagaokakyo (JP); Koichi Yoshikawa, Nagaokakyo (JP)

(73) Assignee: Christopher A. Bennett, Kyoto (JP)

( * ) Notice: Subject to any disclaimer, the term of this patent is extended or adjusted under 35 U.S.C. 154(b) by 355 days.

(21) Appl. No.: 15/704,104

(22) Filed: Sep. 14, 2017

(65) Prior Publication Data

US 2018/0003490 A1 Jan. 4, 2018

Related U.S. Application Data

(63) Continuation of application No. PCT/JP2016/056073, filed on Feb. 29, 2016.

(30) Foreign Application Priority Data

Mar. 17, 2015 (JP) ................................ 2015-053144

(51) Int. Cl.
*G01S 15/00* (2006.01)
*G01B 21/02* (2006.01)
(Continued)

(52) U.S. Cl.
CPC ............. *G01B 21/02* (2013.01); *G01B 17/00* (2013.01); *G01B 21/047* (2013.01); *G01C 15/10* (2013.01);
(Continued)

(58) Field of Classification Search
None
See application file for complete search history.

(56) References Cited

U.S. PATENT DOCUMENTS 4,291,466 A * 9/1981 Bell ....................... G01B 7/001
33/501.04
5,088,068 A * 2/1992 Schaill ................ G10K 11/006
181/124
(Continued)

FOREIGN PATENT DOCUMENTS

CN 101118705 A 2/2008
CN 204020470 U 12/2014
(Continued)

OTHER PUBLICATIONS

Official Communication issued in corresponding Chinese Patent Application No. 201680015841.7, dated Apr. 3, 2019.
(Continued)

*Primary Examiner* — Isam A Alsomiri
*Assistant Examiner* — Jonathan D Armstrong
(74) *Attorney, Agent, or Firm* — Keating & Bennett, LLP

(57) ABSTRACT

A sensor positioning device includes an inter-sensor distance measurement jig that measures a distance between two sensors, and is a reference when setting the distance between the two sensors to a target distance, and reference-setting jigs of sensor height position, each including a weight and a weight suspension member, a lengthwise direction of which is in a vertical direction when the weight is suspended, and each performing setting of a distance which is a total of a vertical direction dimension of the weight, a length of the weight suspension member, and a distance from an upper end of the weight suspension member to the sensor such that the distance coincides with a target height of the sensor, when the weight is in contact with a reference surface, in a state where the weight is attached to a sensor holding jig by the weight suspension member.

12 Claims, 6 Drawing Sheets

(51) Int. Cl.
*G01C 15/10* (2006.01)
*G01B 21/04* (2006.01)
*G01B 17/00* (2006.01)
*G01D 11/24* (2006.01)
*G01D 11/30* (2006.01)
*G01S 5/30* (2006.01)
*G01C 3/18* (2006.01)

(52) U.S. Cl.
CPC ............ *G01D 11/24* (2013.01); *G01D 11/30* (2013.01); *G01S 5/30* (2013.01); *G01C 3/18* (2013.01)

(56) References Cited

U.S. PATENT DOCUMENTS

| | | | | |
|---|---|---|---|---|
| 5,115,888 A | * | 5/1992 | Schneider | A47F 9/048 186/61 |
| 5,390,423 A | * | 2/1995 | Butter | G01B 5/012 33/556 |
| 6,566,864 B1 | * | 5/2003 | Brown | B29C 45/14754 280/6.15 |
| 2007/0124024 A1 | * | 5/2007 | Okamoto | B25J 5/007 700/245 |
| 2008/0031687 A1 | * | 2/2008 | Frankeny | E04F 21/24 404/84.1 |
| 2010/0241397 A1 | * | 9/2010 | Fischer | G01B 5/0004 702/170 |
| 2015/0184353 A1 | * | 7/2015 | Nakaniwa | E02D 11/00 701/50 |
| 2018/0117772 A1 | * | 5/2018 | Ikebe | B25J 13/082 |

FOREIGN PATENT DOCUMENTS

| | | |
|---|---|---|
| JP | 60-242381 A | 12/1985 |
| JP | 1-282413 A | 10/1992 |
| JP | 5-63732 U | 8/1993 |
| JP | 10318872 A * | 12/1998 |
| JP | 2006-338580 A | 12/2006 |
| JP | 2007066086 A * | 3/2007 |
| JP | 2013-124939 A | 6/2013 |

OTHER PUBLICATIONS

Official Communication issued in International Patent Application No. PCT/JP2016/056073, dated May 17, 2016.

* cited by examiner

SENSOR POSITIONING DEVICE

CROSS REFERENCE TO RELATED APPLICATIONS

This application claims the benefit of priority to Japanese Patent Application No. 2015-053144 filed on Mar. 17, 2015 and is a Continuation Application of PCT Application No. PCT/JP2016/056073 filed on Feb. 29, 2016. The entire contents of each application are hereby incorporated herein by reference.

BACKGROUND OF THE INVENTION

1. Field of the Invention

The present invention relates to a sensor positioning device, and more particularly, to a sensor positioning device which is used to set a position of a sensor that detects a position of a position measurement target, to a target position.

2. Description of the Related Art

As a method of detecting the position of a mobile robot (position measurement target) moving on a stage, there is a method of determining the position of the mobile robot by triangulation using a receiver provided to the mobile robot and a plurality of transmitters (sensors) arranged away from the mobile robot, and a method of measuring the position of the mobile robot.

A method of measuring the position of a mobile robot by the above-described method, and a device used for the method are disclosed in Japanese Patent Application Laid-Open No. 2006-338580 (see FIG. 6).

As shown in FIG. 6, according to a device 150 disclosed in Japanese Patent Application Laid-Open No. 2006-338580, a plurality of transmitters (sensors) 155 are arranged on a wall surface 153 around a stage 152. Also, a stroboscopic light source that emits light at a predetermined time interval, and a laser light source that emits laser light through a rotating slit are embedded in the transmitter 155.

A mobile robot 151 is provided with receivers 156 for receiving stroboscopic light and laser light. Also, the mobile robot 151 stores in advance positions of the transmitters 155 fixed on the wall surface 153.

Moreover, the mobile robot 151 is configured to receive stroboscopic light and laser light from the transmitters 155 and to determine its position by triangulation at the time of moving on the stage 152.

However, with the device 150 as described in Japanese Patent Application Laid-Open No. 2006-338580, the transmitters (sensors) 155 must be fixed to predetermined positions around the stage 152, and in the case of causing the mobile robot 151 to operate in a different environment (such as in the case of operating the robot in a different venue), the sensors must be fixed to predetermined positions of the different environment, and there is a problem that the mobile robot 151 cannot be easily operated in a different environment.

SUMMARY OF THE INVENTION

Preferred embodiments of the present invention provide sensor positioning devices which are capable of easily and accurately positioning a sensor even when an environment in which the sensor is to be installed is changed.

A sensor positioning device according to a preferred embodiment of the present invention includes two sensors that detect a position of a position measurement target in cooperation with a sensor provided in the position measurement target, sensor holding jigs that hold the two sensors, respectively, at arbitrary height positions, an inter-sensor distance measurement jig that measures a distance between the two sensors in a horizontal or substantially horizontal direction, and that functions as a reference at a time of setting of the distance between the two sensors in the horizontal or substantially horizontal direction to a predetermined target distance, and reference-setting jigs of sensor height position, each including a weight and a weight suspension member, wherein a lengthwise direction of the weight suspension member is oriented in a vertical direction when the weight is suspended.

Each of the reference-setting jigs of sensor height position is capable of setting a target height of the sensor such that the target height of the respective one of the sensors coincides with a total distance of a vertical direction dimension of the weight, a length of the weight suspension member, and a distance from an upper end of the weight suspension member to respective one of the sensors, in a state where the weight is attached to a respective one of the sensor holding jigs via the weight suspension member, and the weight is in contact with a reference surface in a height direction.

The height positions of the two sensors are adjusted to respective target height positions set by the reference-setting jigs of sensor height position.

A distance between the two sensors is able to be adjusted to the target distance based on the distance between the two sensors determined by the inter-sensor distance measurement jig.

Also, in a sensor positioning device according to a preferred embodiment of the present invention, the sensors are preferably held by the sensor holding jigs to be positioned on lines extending from vertical axes of the weight suspension members attached to the sensor holding jigs.

According to the configuration described above, the sensors are able to be positioned directly above the weights at all times, and the distance between the sensors in the horizontal or substantially horizontal direction is able to be easily and reliably detected based on the gap between the two weights, and also, when the sensor holding jigs are rotated around the vertical axes of the weight suspension members attached to the sensor holding jigs, the orientations of the sensors are able to be changed without changing the positions in the horizontal direction.

Also, in a sensor positioning device according to a preferred embodiment of the present invention, a gap between the sensors is preferably determined based on a gap between the two weights that are suspended, respectively, from the two sensor holding jigs by the weight suspension members.

In a case where the gap between the sensors is determined based on the gap between the two weights that are suspended, respectively, from the two sensor holding jigs by the weight suspension members, the distance between the two sensors in the horizontal direction may be easily and accurately set.

Furthermore, the sensor holding jigs each preferably further includes a base unit capable of extending and contracting, and a sensor holding unit attached to an upper portion of the base unit, and configured to hold the respective one of the sensors. The sensor holding unit is preferably held by the base unit such that an axis direction of the sensor holding unit is inclined at a predetermined inclination to an axis direction of the base unit.

According to the configuration described above, the height positions and the orientations of the two sensors may be easily changed.

Furthermore, the sensor holding unit preferably includes a horizontal shaft, a shaft center of which is extended on a line on which the respective one of the sensors is positioned, and an attachment member to attach the weight suspension member is preferably rotatably attached to the horizontal shaft.

According to the configuration described above, even in a case where the inclinations of the sensor holding units are changed and the orientations or the heights of the sensors are changed, the weights are positioned directly below the sensors at all times, and thus, the height positions of the two sensors or the distance between the sensors in the horizontal direction may be easily reset.

Moreover, the attachment member is preferably detachably attached to each of the sensor holding jigs.

According to the configuration described above, the weight and the weight suspension member may be detached, together with the attachment member, from the sensor holding jig, thus facilitating accommodation or conveyance, for example.

Moreover, the sensors preferably include at least one of an ultrasonic transmission function and an ultrasonic reception function.

In the case where the sensors include at least one of an ultrasonic transmission function and an ultrasonic reception function, an ultrasonic signal may be transmitted from an accurate position or may be received at an accurate position by performing positioning by using the sensor positioning device according to a preferred embodiment of the present invention, and the position of a position measurement target (such as a mobile robot) is able to be accurately detected.

The sensor positioning devices according to preferred embodiments of the present invention are structured to adjust the height positions of the two sensors to respective target height positions set by the reference-setting jigs of sensor height position, and to be able to adjust the distance between the two sensors in the horizontal direction to a target distance based on the distance between the two sensors in the horizontal direction determined by the inter-sensor distance measurement jig, and thus, the height positions of the two sensors and the distance between the sensors may be easily and accurately set.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A is a front view and FIG. 3B is a side view.

FIG. 4A is a side view and FIG. 4B is a view from below.

DETAILED DESCRIPTION OF THE PREFERRED EMBODIMENTS

Next, the present invention will be described in further detail with reference to preferred embodiments of the present invention.

Figure 1:
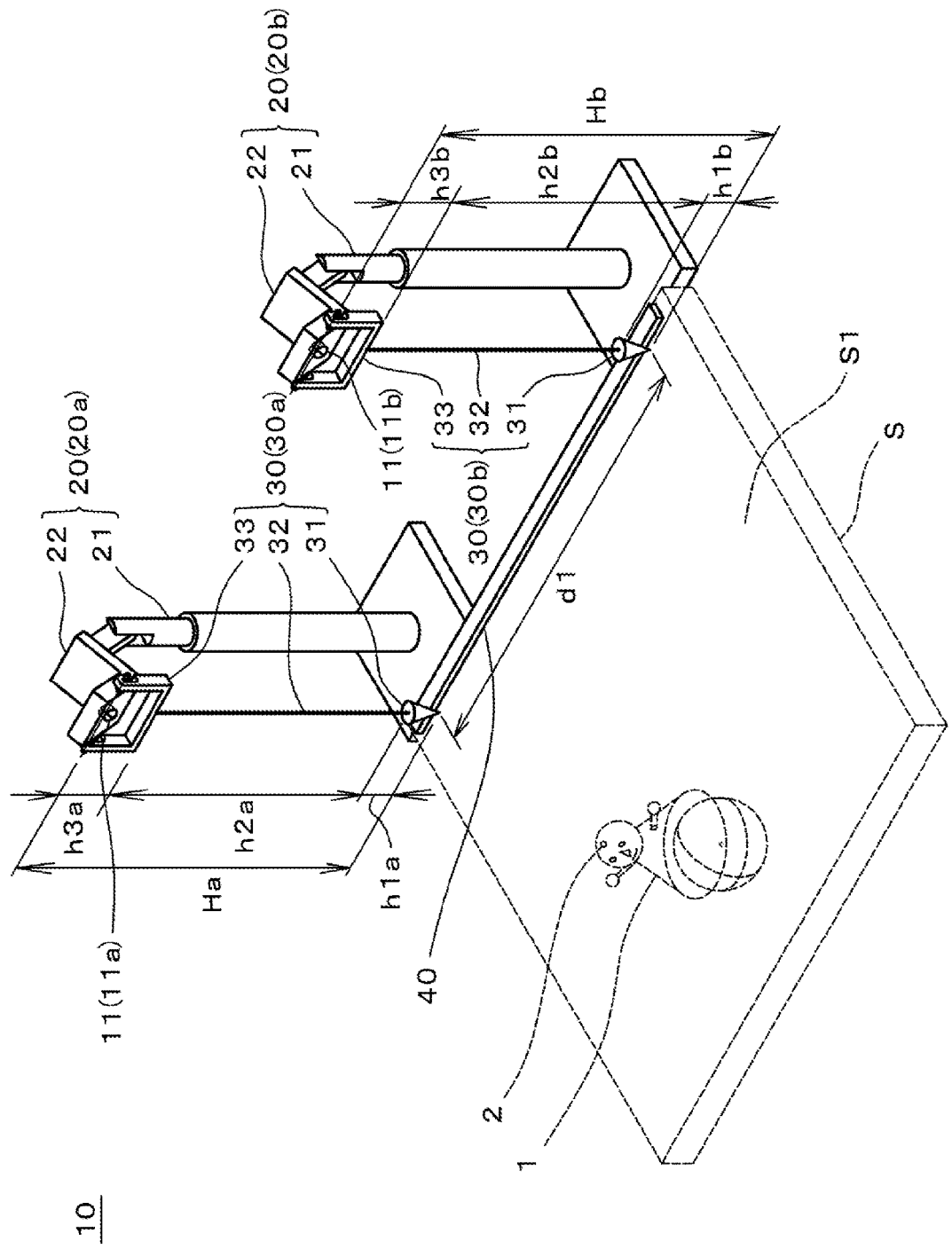
FIG. 1 is a perspective view showing a schematic configuration of a sensor positioning device according to a first preferred embodiment of the present invention.

As shown in FIG. 1, a sensor positioning device 10 according to a preferred embodiment of the present invention includes two sensors 11 (11a, 11b) that detect the position of a position measurement target 1, and two sensor holding jigs 20 (20a, 20b), each holding the corresponding one of the two sensors 11 at an arbitrary height position.

Furthermore, the sensor positioning device 10 includes two reference-setting jigs of sensor height position 30 (30a, 30b), which include weights 31 and weight suspension members 32, and which perform setting of the two sensors 11 (11a, 11b) such that the two sensors 11 (11a, 11b) coincide with a target height.

Moreover, the sensor positioning device 10 includes an inter-sensor distance measurement jig 40, which measures the distance between the two sensors 11 (11a, 11b) in the horizontal direction, and which functions as a reference at the time of setting of the distance between the sensors 11 in the horizontal direction to a predetermined target distance. As the inter-sensor distance measurement jig 40, a scaled ruler is preferably used, for example.

In the present preferred embodiment, preferably the position measurement target 1 is a mobile robot, and a sensor 2 is provided inside the mobile robot, for example. Specifically, the mobile robot is capable of moving in the horizontal direction while balancing on a ball.

Furthermore, the two sensors 11 (11a, 11b) of the sensor positioning device 10 according to the present preferred embodiment include an ultrasonic transmitting function, and are capable of detecting the position of the position measurement target 1 in cooperation with the sensor 2, of the position measurement target 1, including an ultrasonic receiving function. However, there are no particular restrictions on the configurations and the types of the sensors, and it is also possible to use sensors including an ultrasonic receiving function as the two sensors 11 (11a, 11b), and a sensor including an ultrasonic transmitting function as the sensor 2 provided to the position measurement target 1.

As shown in FIG. 1 to FIGS. 3A and 3B, the two sensor holding jigs 20 (20a, 20b) each includes a base unit 21 as a foundation portion, and a sensor holding unit 22, which is attached to an upper portion of the base unit 21 and which holds the sensor 11.

The base unit 21 of the sensor holding jig 20 (20a, 20b) is installed on the floor, and is capable of extending or contracting in an axis direction (in the present preferred embodiment, the vertical direction). The height position of the sensor 11 held by the sensor holding jig 20 may be adjusted by extending or contracting the base unit 21. Additionally, the base unit 21 may alternatively be installed on a stage S.

The sensor holding unit 22 includes a holding unit main body 22a, and an attachment shaft unit 22b attaching the holding unit main body 22a to the base unit 21.

Moreover, the two sensors 11 (11a, 11b) are each attached to the holding unit main body 22a with a circuit board 22d interposed therebetween, the circuit board 22*d* including the corresponding sensor 11 mounted thereon.

Moreover, the sensor holding unit 22 is held by the base unit 21 while being inclined such that the axis direction of the attachment shaft unit 22*b* is at a predetermined inclination to the axis direction of the base unit 21. The position of the corresponding sensor 11 (11*a*, 11*b*) in the height direction and the direction the corresponding sensor 11 (11*a*, 11*b*) faces may be adjusted by changing the inclination.

Furthermore, the sensor holding unit 22 includes, on both side surfaces, a pair of horizontal or substantially horizontal shafts 22*c*, which protrude in the horizontal or substantially horizontal direction, and to which an attachment member (in the present preferred embodiment, a U-shaped hook) 33 of the reference-setting jig of sensor height position 30 (30*a*, 30*b*) is to be attached.

Furthermore, the weight suspension member 32 defining the reference-setting jig of sensor height position 30 (30*a*, 30*b*) is structured to straighten due to the weight 31, and to have a lengthwise direction oriented in the vertical direction, when the weight 31 attached to the lower end is suspended. Additionally, as the material of the weight suspension member 32, a wire or a chain may preferably be used, for example.

Additionally, in the present preferred embodiment, the weight suspension member 32 preferably is attached to the sensor holding unit 22 by the attachment member 33, such as a hook, for example, but the upper end side of the weight suspension member 32 may be formed into a ring, for example, so that a portion of the weight suspension member 32 also defines and functions as the attachment member 33.

Furthermore, according to the sensor positioning device 10, the two sensors 11 (11*a*, 11*b*) are both held by the sensor holding jigs 20 (20*a*, 20*b*) so as to be positioned on lines X1*a*, X1*b* extending from the vertical axes of the weight suspension members 32, which define the reference-setting jig of sensor height positions 30 (30*a*, 30*b*) attached to the sensor holding jigs 20 (20*a*, 20*b*).

By positioning the sensors 11 (11*a*, 11*b*) on the lines X1*a*, X1*b* extending from the vertical axes of the weight suspension members 32, positions of the sensors 11 (11*a*, 11*b*) in the horizontal or substantially horizontal direction are prevented from being changed even when the sensor holding jigs 20 (20*a*, 20*b*) are rotated around the vertical axes of the weight suspension members 32.

Moreover, in the present preferred embodiment, the sensors 11 (11*a*, 11*b*) are held by the sensor holding units 22 so as to be positioned on lines X2*a*, X2*b* extending from shaft centers of the horizontal or substantially horizontal shafts 22*c* of the sensor holding units 22.

Figure 2:
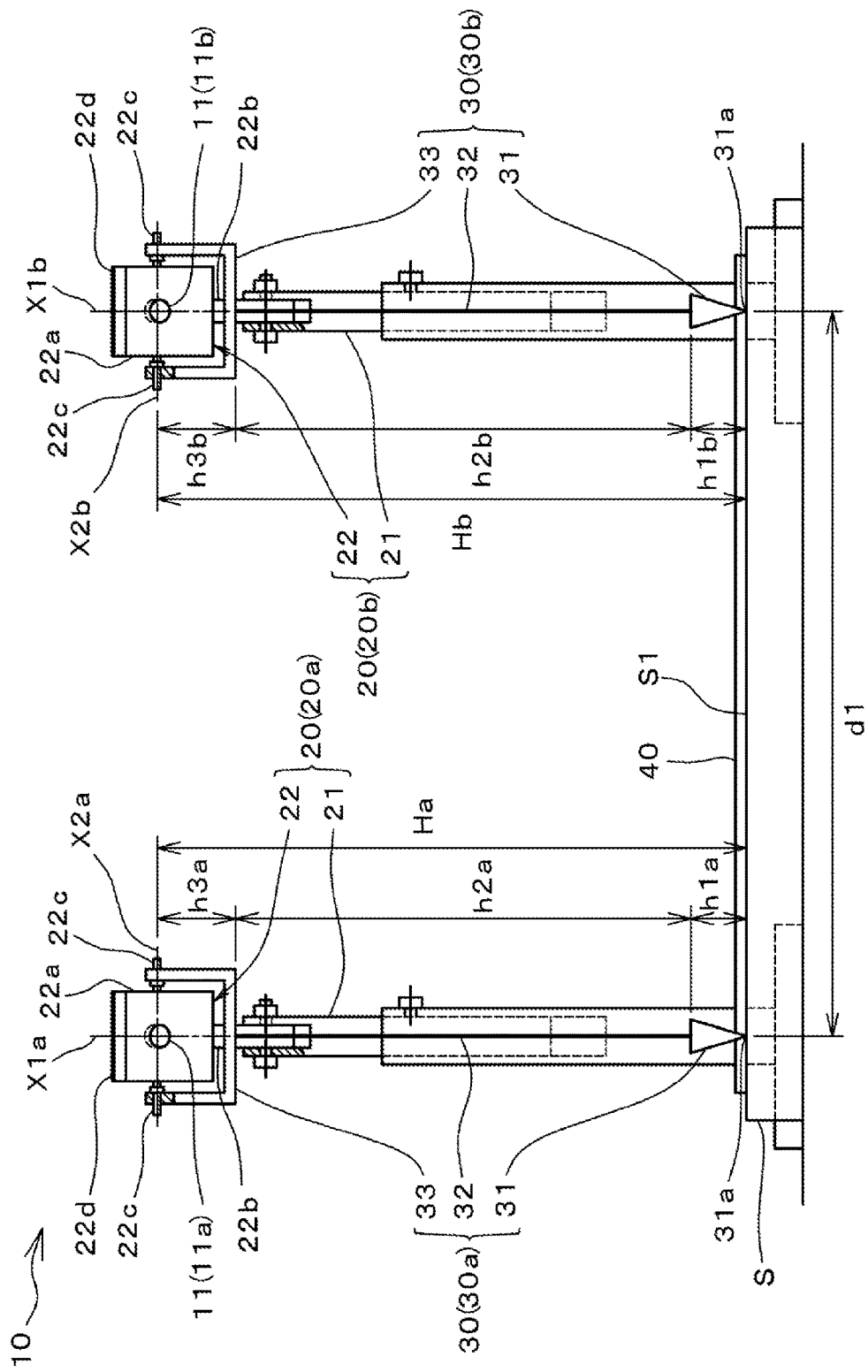
FIG. 2 is a front view of the sensor positioning device according to the first preferred embodiment of the present invention.
Figure 3A:
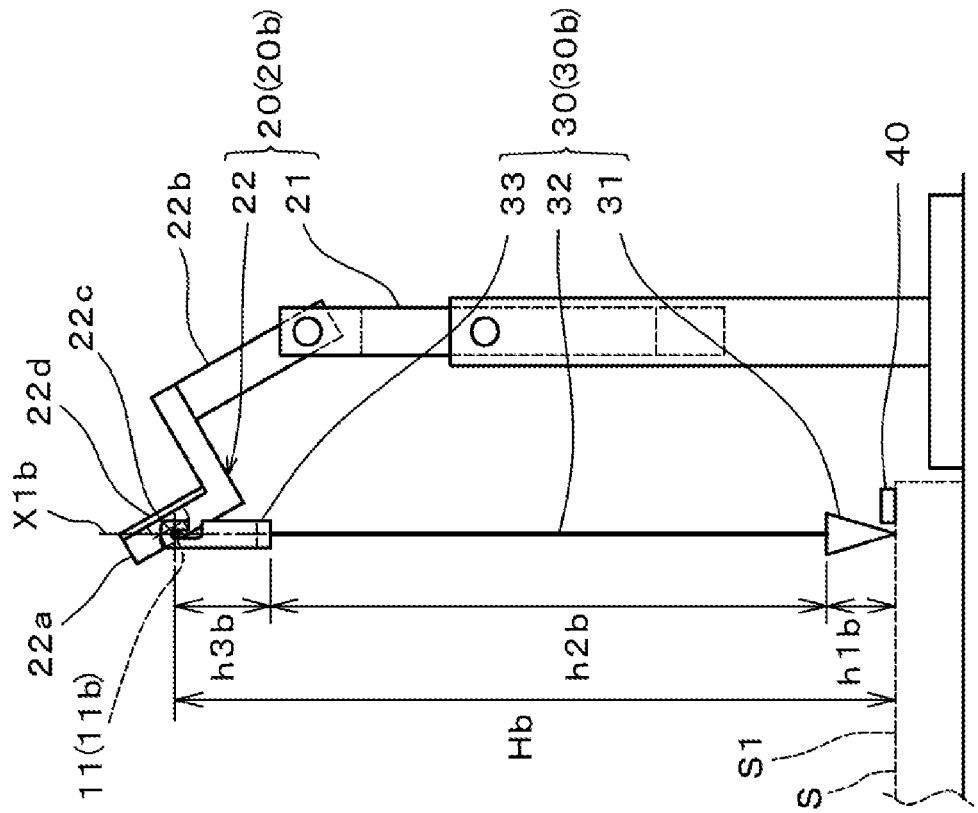
FIGS. 3A and 3B are diagrams showing a sensor holding jig defining the sensor positioning device shown in FIG. 2, where
Figure 3B:
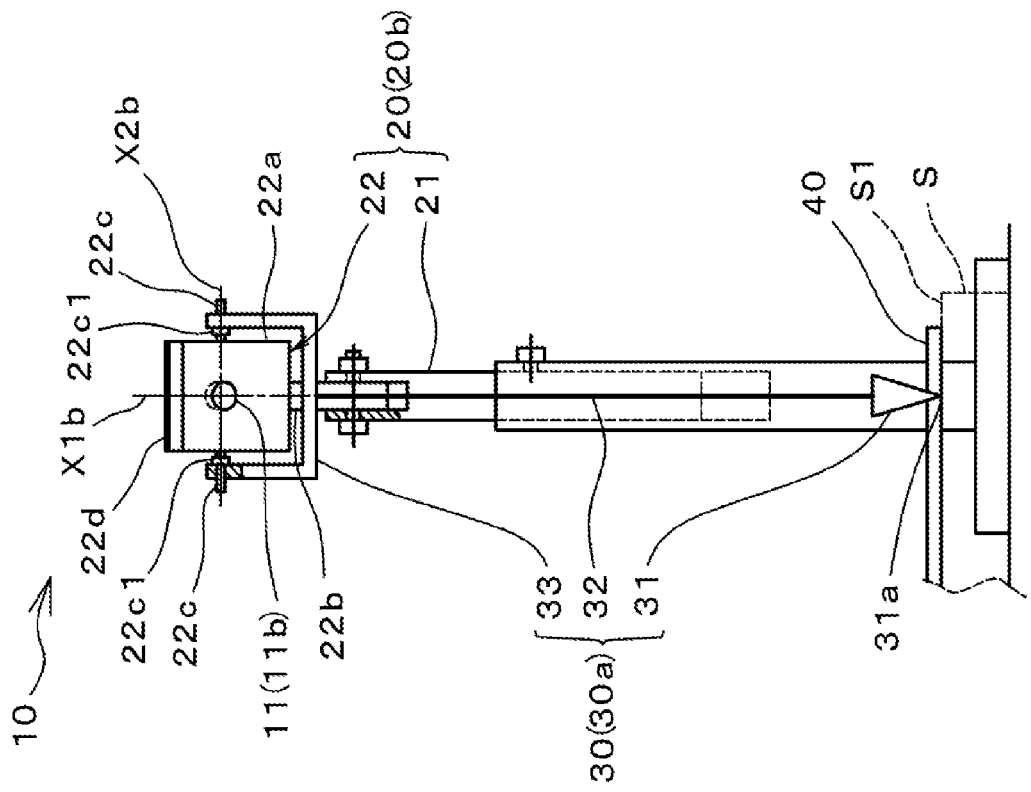

Additionally, in the present preferred embodiment, as shown in FIG. 2 and FIGS. 3A and 3B, for example, the attachment members 33 are engaged with the horizontal or substantially horizontal shafts 22*c* such that the attachment members 33 are not shifted in the shaft center direction of the horizontal or substantially horizontal shafts 22*c*, and the sensors 11 (11*a*, 11*b*) are, thus, are allowed to be positioned on the lines X1*a*, X1*b* extending from the vertical axes of the weight suspension members 32 and on the lines X2*a*, X2*b* extending from the shaft centers of the horizontal or substantially horizontal shafts 22*c*.

Additionally, as the method of attaching the attachment member 33 such that the attachment member 33 is not shifted in the shaft center direction of the horizontal or substantially horizontal shafts 22*c*, a method of providing positioning flange portions 22*c*1 at predetermined positions of the horizontal or substantially horizontal shafts 22*c*, as shown in FIG. 3A, or of interposing spacers (not shown), for example, may be used.

Figure 4A:
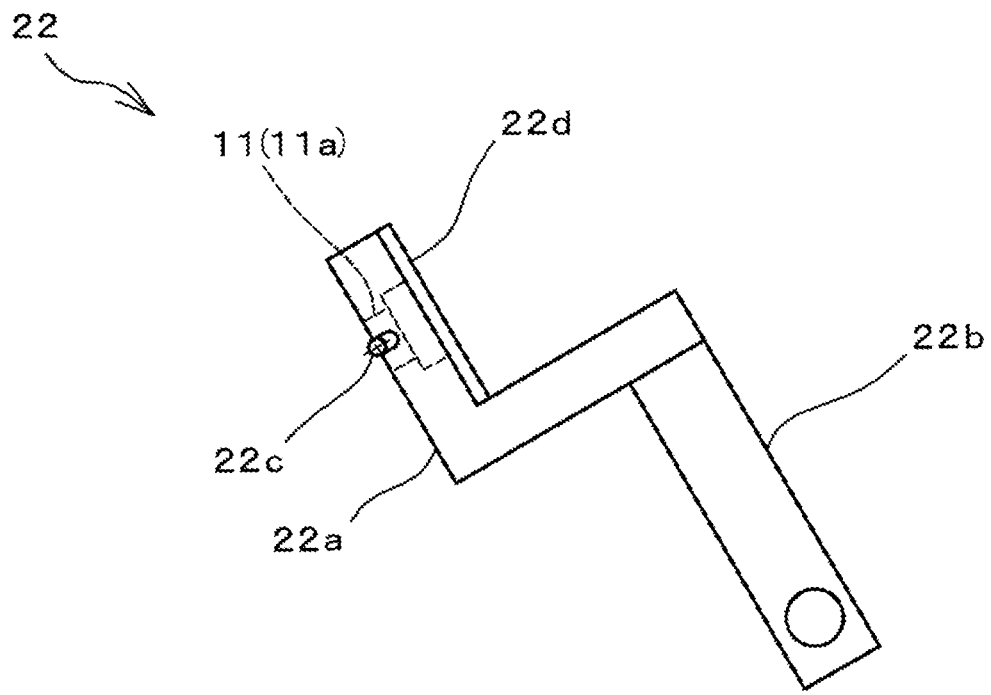
FIGS. 4A and 4B are enlarged views showing an example modification of a sensor holding unit of the sensor holding jig shown in FIGS. 3A and 3B, where
Figure 4B:
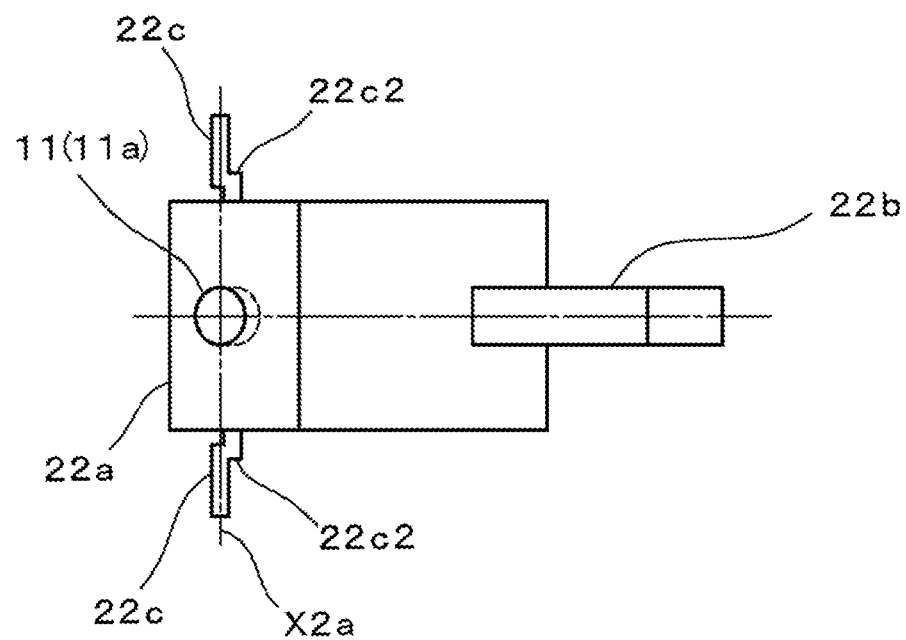

For example, in the case where the attachment positions of the horizontal or substantially horizontal shafts 22*c* on both side surfaces of the sensor holding unit 22 and the position, seen from the shaft direction of the horizontal or substantially horizontal shafts 22*c*, of a function unit (such as a portion that transmits ultrasound) of the sensor 11 (11*a*) are not coincident, step portions 22*c*2 may be provided on the horizontal or substantially horizontal shafts 22*c*, and the shaft centers of the horizontal or substantially horizontal shafts 22*c* may be caused to pass through positions shifted from the attachment positions of the horizontal or substantially horizontal shafts 22*c* on both side surfaces of the sensor holding unit 22, as shown in FIGS. 4A and 4B, so that the function unit of the sensor 11 (11*a*) is positioned on the line X2*a* extending from the shaft centers of the horizontal or substantially horizontal shafts 22*c*.

Moreover, according to the sensor positioning device 10 of the present preferred embodiment, one reference-setting jig of sensor height position 30 (30*a*) of the reference-setting jigs of sensor height position 30 (30*a*, 30*b*) is able to set, as a target height of the sensor 11 (11*a*), a distance (length) Ha, which is a total of a vertical direction dimension h1*a* of the weight 31, a length h2*a* of the weight suspension member 32, and a distance h3*a* from an upper end of the weight suspension member 32 to the sensor 11, when the weight 31 is in contact with a reference surface (upper surface of the stage S) S1, as a reference for the sensor 11, in the height direction, in a state where the weight 31 is suspended from the sensor holding jig 20 (that is, the horizontal or substantially horizontal shafts 22*c* of the sensor holding unit 22) by the weight suspension members 32 and the attachment member 33.

Also, the other reference-setting jig of sensor height position 30 (30*b*) is able to set, as a target height of the sensor 11 (11*b*), a distance Hb, which is a total of a vertical direction dimension h1*b* of the weight 31, a length h2*b* of the weight suspension member 32, and a distance h3*b* from an upper end of the weight suspension member 32 to the sensor 11, when the weight 31 is in contact with the reference surface (upper surface of the stage S) S1, as a reference for the sensor 11 in the height direction, in a state where the weight 31 is suspended from the sensor holding jig 20 (that is, the horizontal or substantially horizontal shafts 22*c* of the sensor holding unit 22) by the weight suspension members 32 and the attachment member 33.

That is, by causing the heights of the two sensors 11 (11*a*, 11*b*) to be heights that are equal or substantially equal to the distances Ha, Hb, the heights of the two sensors 11 (11*a*, 11*b*) may be set to the target heights.

Additionally, the distances h3*a*, h3*b* in the present preferred embodiment are distances, along the vertical direction, from the upper ends of the weight suspension members 32 to the sensors 11 (11*a*, 11*b*).

Furthermore, in the present preferred embodiment, the distances h3*a*, h3*b*, along the vertical direction, to the sensors 11 (11*a*, 11*b*) are preferably equal or substantially equal to the distances, along the vertical direction, to the shaft centers of the horizontal or substantially horizontal shafts 22*c* to which the attachment members 33 are attached.

As described above, the sensor positioning device 10 of the present preferred embodiment is configured such that the heights of the two sensors 11 (11*a*, 11*b*) are able to be set to the respective target heights by the two reference-setting jigs of sensor height position 30 (30*a*, 30*b*). Additionally, the two sensors 11 (11a, 11b) are able to be positioned at target heights also in a case where the target heights of the two sensors 11 (11a, 11b) are the same or substantially the same.

With the sensor positioning device 10 of the present preferred embodiment, the inter-sensor distance measurement jig 40 is provided on the upper surface (reference surface) S1 of the stage S. The upper surface (reference surface) S1 of the stage S is assumed to be horizontal or substantially horizontal, and the distance between the two sensors 11 (11a, 11b) in the horizontal or substantially horizontal direction is measured by measuring the distance between the weights 31 of the reference-setting jigs of sensor height position 30 (30a, 30b) by the inter-sensor distance measurement jig 40.

Additionally, as the inter-sensor distance measurement jig 40, a steel material or a wire having a predetermined length may preferably be used, instead of the scaled ruler. Also, adjustment may be performed by matching two marks drawn in advance on the stage S with a predetermined gap therebetween and lower ends 31a of the weights 31.

Next, a non-limiting example of a method of setting the positions of the sensors 11 using the sensor positioning device 10 will be described. Additionally, a case where the target heights of the two sensors 11 (11a, 11b) are the same or substantially the same will be described.

First, the above-described distances (lengths), Ha and Hb, of the reference-setting jigs of sensor height position 30 (30a, 30b) are adjusted to be the target height of the sensors 11 (11a, 11b).

Additionally, a plurality of reference-setting jigs of sensor height position 30 (30a, 30b) with varied Ha and Hb may be prepared in advance by assuming predetermined target heights, and reference-setting jigs of sensor height position 30 (30a, 30b) with predetermined Ha and Hb may be selected to be used.

Then, the reference-setting jigs of sensor height position 30 (30a, 30b) are attached to the sensor holding units 22 defining the sensor holding jigs 20 (20a, 20b), and the heights of the sensor holding jigs 20 (20a, 20b) are adjusted such that the weights 31 suspended by the weight suspension members 32 slightly contact the upper surface (reference surface) S1 of the stage S in a state where the weight suspension members 32 are made straight by the weights 31.

Depending on the situation, the heights of the sensor holding jigs 20 (20a, 20b) may be adjusted until just before the lower ends 31a of the weights 31 suspended by the weight suspension members 32 contact the upper surface (reference surface) S1 of the stage S (i.e., the lower ends 31a are in a slightly floating state).

Additionally, a slackened portion of the weight suspension member 32 caused by the lower end 31a of the weight 31 coming into contact with the upper surface (reference surface) S1 of the stage S or the slight amount of floating of the lower end 31a of the weight 31 from the upper surface (reference surface) S1 of the stage S is considered as a shift (error) from the target value, but it is not a problem as long as the shift is within an allowable range.

The sensor 11 (11a, 11b) is held at a height position which is substantially considered as the target.

Next, in this state, the gap between the sensor holding jigs 20 (20a, 20b) is adjusted so as to cause the distance between the two weights 31 in the horizontal or substantially horizontal direction to reach a target distance d1 between the two sensors 11 (11a, 11b) in the horizontal or substantially horizontal direction, while checking the distance between the two weights 31 in the horizontal or substantially horizontal direction by the inter-sensor distance measurement jig 40.

The distance between the sensors 11 (11a, 11b) in the horizontal or substantially horizontal direction is adjusted to the target distance.

Next, a description will be given with reference to FIG. 5 regarding a case of detecting the position of a mobile robot (robot which is remotely operated by a control device such as a computer, not shown, so as to be able to move in a predetermined direction on the stage S) 1, which is a position measurement target, by using the two sensors 11 (11a, 11b), positions of which have been set using the sensor positioning device 10 described above. Additionally, FIG. 5 shows a state where position setting of the two sensors 11 (11a, 11b) has been completed, and the reference-setting jigs of sensor height position 30 (30a, 30b) and the inter-sensor distance measurement jig 40 have been detached.

Additionally, a case is described where two transmitters that transmit ultrasound are used as the two sensors 11 (11a, 11b), and a receiver that receives ultrasound is provided as the sensor 2 on the mobile robot 1, at a position at a height H2 from the upper surface (reference surface) S1 of the stage S.

Figure 5:
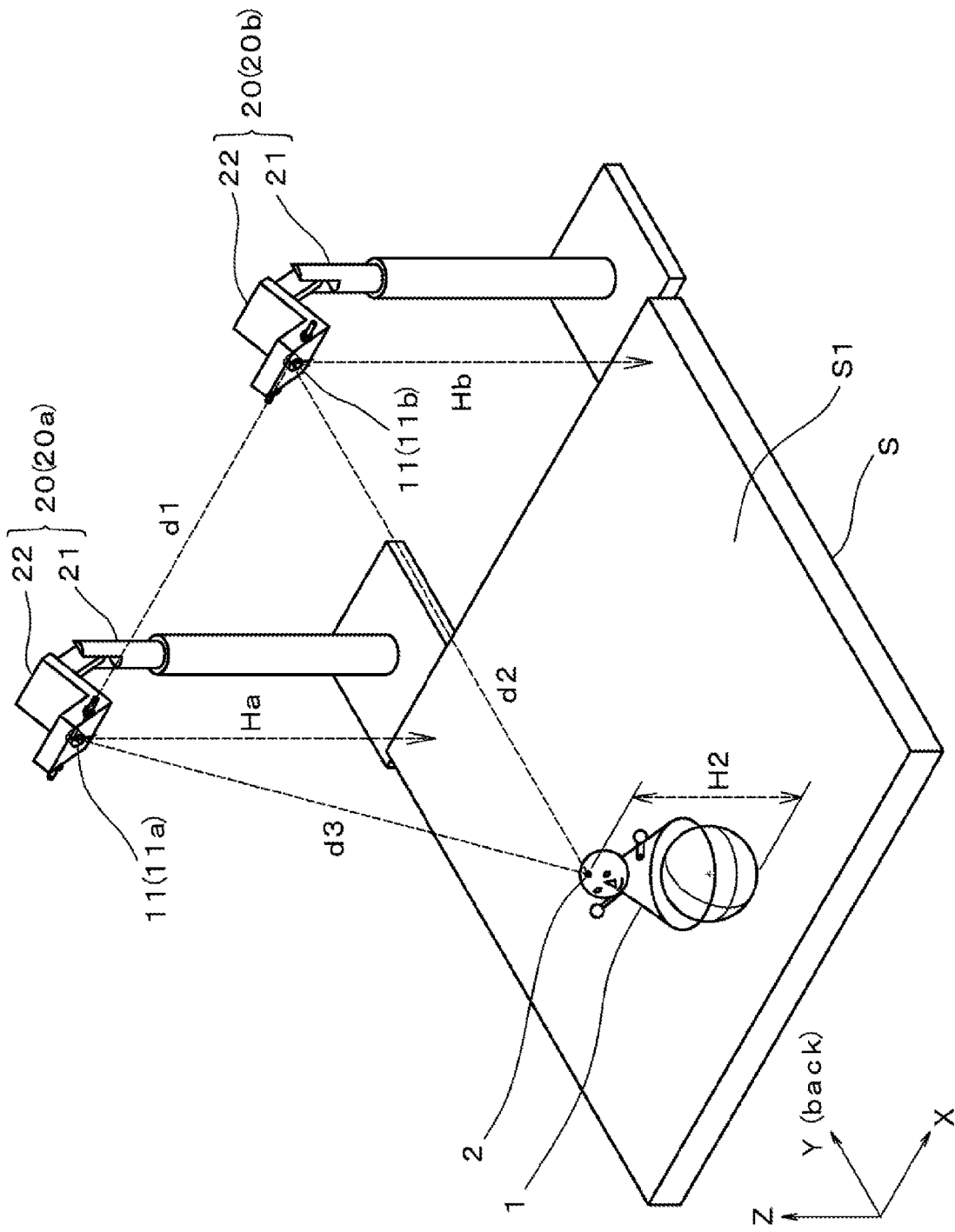
FIG. 5 is a diagram showing an example use of a sensor installed by using the sensor positioning device.
Figure 6:
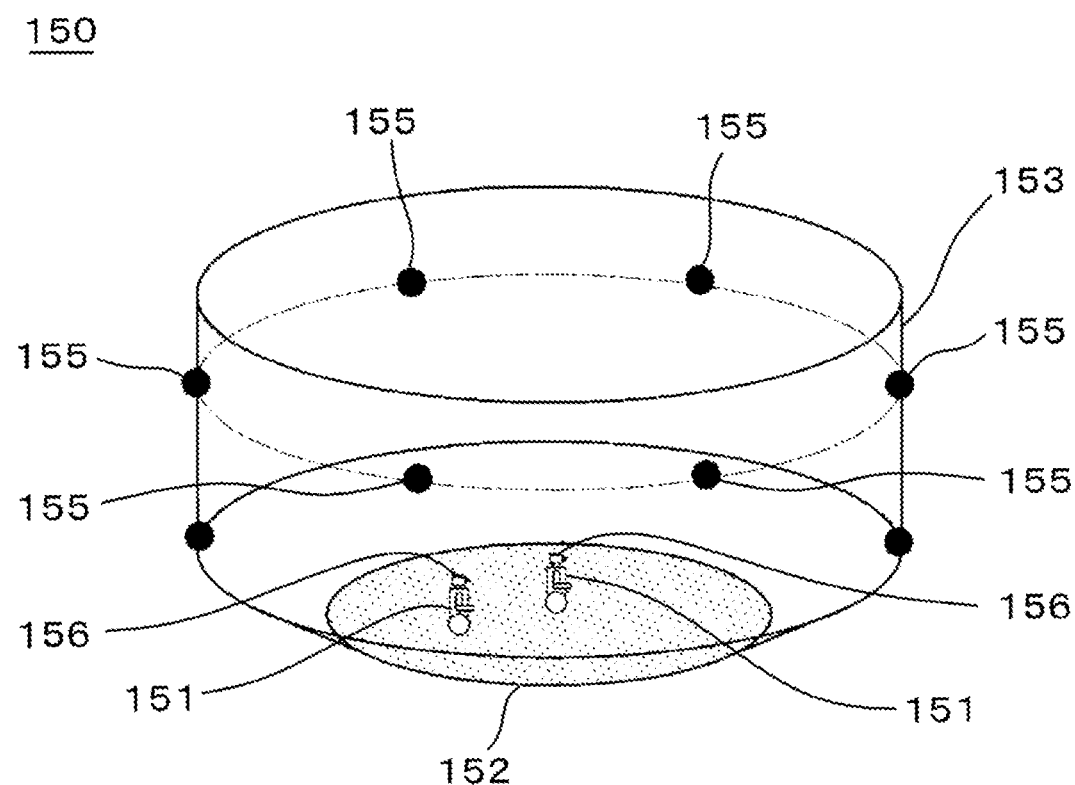
FIG. 6 is a diagram showing example installation of conventional transmitters (sensors).

In a state as shown in FIG. 5, the two sensors 11 (11a, 11b) are positioned at the target heights Ha, Hb (Ha=Hb), and the distance between the sensors 11 (11a, 11b) in the horizontal or substantially horizontal direction is set to the target distance d1, and thus, distances d2, d3 from the two sensors (transmitters) 11 (11a, 11b) to the sensor (receiver) 2 of the mobile robot 1 may be accurately determined based on the time differences between the transmission times from the two sensors (transmitters) 11 (11a, 11b) and the reception times at the sensor (receiver) 2 of the mobile robot 1.

Furthermore, because the height positions Ha, Hb (Ha=Hb) of the two sensors (transmitters) 11 (11a, 11b) and the distance d1 between the two sensors (transmitters) 11 (11a, 11b) are set in advance, the position of the mobile robot 1 in the horizontal or substantially horizontal direction may be accurately detected based on the relationship between the lengths of the three sides of the triangle.

Additionally, the two sensors (transmitters) 11 (11a, 11b) may also preferably include a light transmitter that uses infrared light, in addition to the ultrasonic transmitter. The distances d2, d3 may be accurately measured in real time by transmitting infrared light and ultrasound at the same time and by using the difference in the arrival times of the infrared light and the ultrasound from the sensor at the mobile robot 1.

Furthermore, the above-described preferred embodiment describes a case where the target heights of the two sensors 11 (11a, 11b) are the same or substantially the same, but the target height positions may also be made different from each other.

Moreover, the above-described preferred embodiment describes a case where the positions of two sensors are set, but it is also applicable to a case where the positions of three or more sensors are set.

The present invention is not limited to the preferred embodiments described above in any other aspect, and various applications and modifications may be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensor positioning device comprising:
two sensors that detect a position of a position measurement target in cooperation with a sensor provided in or on the position measurement target;
sensor holding jigs that hold the two sensors, respectively, at arbitrary height positions;
an inter-sensor distance measurement jig that measures a distance between the two sensors in a horizontal or substantially horizontal direction, and that functions as a reference at a time of setting the distance between the two sensors in the horizontal or substantially horizontal direction to a predetermined target distance; and
reference-setting jigs of sensor height position, each including a weight and a weight suspension member; wherein
a lengthwise direction of the weight suspension member is oriented in a vertical direction when the weight is suspended;
each of the reference-setting jigs of sensor height position is structured to set a target height of a respective one of the sensors such that the target height of the respective one of the sensors coincides with a total distance of a vertical direction dimension of the weight, a length of the weight suspension member, and a distance from an upper end of the weight suspension member to the respective one of the sensors, in a state where the weight is attached to a respective one of the sensor holding jigs via the weight suspension member, and the weight is in contact with a reference surface in a height direction;
the height positions of the two sensors are adjusted to respective target height positions set by the reference-setting jigs of sensor height position; and
a distance between the two sensors is adjusted to the target distance based on the distance between the two sensors determined by the inter-sensor distance measurement jig.

2. The sensor positioning device according to claim 1, wherein the two sensors are held by the sensor holding jigs to be positioned on lines extending from vertical axes of the weight suspension members attached to the sensor holding jigs.

3. The sensor positioning device according to claim 2, wherein a gap between the sensors is determined based on a gap between two weights that are suspended, respectively, from the two sensor holding jigs via the weight suspension members.

4. The sensor positioning device according to claim 1, wherein each of the sensor holding jigs includes:
a base unit capable of extending and contracting; and
a sensor holding unit attached to an upper portion of the base unit, and configured to hold the respective one of the sensors; wherein
the sensor holding unit is held by the base unit such that an axis direction of the sensor holding unit is inclined at a predetermined inclination to an axis direction of the base unit.

5. The sensor positioning device according to claim 4, wherein
the sensor holding unit includes a horizontal or substantially horizontal shaft, such that the respective one of the sensors is positioned on an extending line of a shaft center of the horizontal or substantially horizontal shaft; and
an attachment member that attaches the weight suspension member is rotatably attached to the horizontal or substantially horizontal shaft.

6. The sensor positioning device according to claim 5, wherein the attachment member is detachably attached to each of the sensor holding jigs.

7. The sensor positioning device according to claim 5, wherein the attachment member is a U-shaped hook.

8. The sensor positioning device according to claim 1, wherein the sensors include at least one of an ultrasonic transmission and an ultrasonic reception function.

9. The sensor positioning device according to claim 1, wherein the weight suspension member is a wire or a chain.

10. The sensor positioning device according to claim 1, wherein positioning flange portions are provided at predetermined positions of the horizontal or substantially horizontal shafts.

11. The sensor positioning device according to claim 1, wherein the inter-sensor distance measurement jig is a scaled ruler.

12. The sensor positioning device according to claim 1, wherein the inter-sensor distance measurement jig is a steel material or a wire having a predetermined length.

* * * * *